United States Patent

Banks et al.

[11] Patent Number: 5,901,334
[45] Date of Patent: May 4, 1999

[54] SYSTEM FOR CALCULATING EXPECTED LENGTH OF TIME IN TRANSIENT QUEUE BY A FORMULA IN THE EVENT ITEMS CANNOT BE ALLOCATED TO THE BUFFER

[75] Inventors: Timothy William Banks, Winchester; Paul Weeden, Eastleigh; Kevin John Turner, Southampton; David John Wyatt, Romsey, all of United Kingdom

[73] Assignee: International Business Machines Corporation

[21] Appl. No.: 08/678,371

[22] Filed: Jun. 27, 1996

[30] Foreign Application Priority Data

Dec. 30, 1993 [WO] WIPO ............... PCT/GB93/02673

[51] Int. Cl.$^6$ ........................................... G06F 13/00
[52] U.S. Cl. ......................................................... 395/876
[58] Field of Search ........................... 395/200.59, 821, 395/859, 872

[56] References Cited

U.S. PATENT DOCUMENTS

| | | | |
|---|---|---|---|
| 3,237,154 | 2/1966 | Barker | 340/934 |
| 3,304,539 | 2/1967 | Auer, Jr. | 340/920 |
| 4,858,120 | 8/1989 | Samuelson | 705/11 |
| 5,093,912 | 3/1992 | Dong et al. | 395/674 |
| 5,166,930 | 11/1992 | Braff et al. | 370/235 |
| 5,233,606 | 8/1993 | Pashan et al. | 370/418 |
| 5,289,470 | 2/1994 | Chang et al. | 711/173 |
| 5,361,372 | 11/1994 | Rege et al. | 395/200.64 |
| 5,375,204 | 12/1994 | Motoyama et al. | 345/507 |
| 5,627,658 | 5/1997 | Connors et al. | 358/407 |
| 5,699,519 | 12/1997 | Shiobara | 395/200.11 |

FOREIGN PATENT DOCUMENTS 0539130  4/1993  European Pat. Off. .

OTHER PUBLICATIONS

IEEE Transactions on Communication Technology, vol. COM–28, No. 4, Apr. 1980, New York, pp. 553–574, "Flow Control: A Comparative Survey" by M. Gerla et al.

Kleinrock, "Queueing Systems, vol. I: Theory", 1975, John Wiley & Sons, New York, Chapter 1, Chapter 2 Par. 2.1, Chapter 3 Par. 3.2, 3.6, Formula's 2.24, 2.26.

IBM Technical Disclosure Bulletin, vol. 33, No. 11, Apr. 1991, New York, pp. 118–121, "Asynchronous Wait on Multiple Data Queues".

Primary Examiner—Thomas C. Lee
Assistant Examiner—Anderson I. Chen
Attorney, Agent, or Firm—Jeanine S. Ray-Yarletts

[57] ABSTRACT

Disclosed is a data processing system and a method of managing a queue 130 of items for processing in which the expected time an item will spend on the queue 130 is calculated 209 when an item is received to be placed on a queue 130. If this exceeds an upper limit, then the item is rejected 213 and the queue 130 is purged 215 of all items. An indication is provided to the sources of the items that were purged that this has occurred. In this way, it is possible to detect the difference between a queue 130 which is longer, but dynamic, and one which is shorter, but static. The method is applied to management of requests for a communications link between local and remote systems.

10 Claims, 3 Drawing Sheets

SYSTEM FOR CALCULATING EXPECTED LENGTH OF TIME IN TRANSIENT QUEUE BY A FORMULA IN THE EVENT ITEMS CANNOT BE ALLOCATED TO THE BUFFER

This is a by-pass continuation application of PCT/GB93/02673 dated Dec. 30, 1993.

FIELD OF THE INVENTION

The invention relates to queue management in a data processing system.

BACKGROUND OF THE INVENTION

In large data processing complexes, tasks are commonly performed by a number of related systems in the complex communicating with each other. These related systems are individual operating systems running on data processing machines which are linked by a data network to form a single complex.

In order that the related systems may operate within a complex, there must be some means for communicating data items such as variables and instructions between the systems. Communication is initiated by the acquisition of one or more real or virtual communications links between the local system and a remote system. Such virtual communications links are provided by, for example, the IBM Virtual Telecommunications Access Method (VTAM), which is a network management system. Normally the acquisition and relinquishing of the links is an ongoing process which does not cause a bottleneck of link acquisition requests to build up, assuming that sufficient links are provided. The local system performs those steps in a task which it can complete without access to remote resources, such as input devices, output devices or storage containing programs or data. When a step in a task requires access to resources remote from the system then it will issue a request to link to those resources in the remote system.

Although operation using multiple linked systems should not result in the failure of a remote system causing failure of a local system, there are circumstances where this may occur. If there is a major problem in a remote system, such that the remote system slows down or the remote system stalls without terminating operation, it can result in a build up of queued or waiting requests for links to the remote system at the local system. The local system will have a large number of link acquisition requests (hereinafter called requests) waiting to be serviced. Tasks dependent on access to remote resources will thus not complete and the system will take up additional storage and other resources with the result that it slows down or stops operation. This may in turn cause similar problems in other systems. In this way, the failure of one system can cause a spread of sympathetic failures in other systems throughout the complex.

One prior art solution is to have a first program running on each system which at predetermined intervals (for example, the receipt of ten requests), sends a communication over the link to a second program running at the other end of the link, informing the second program that the first program is processing requests normally. The second program takes no part in the communication, apart from receiving the confirmation. Such a solution is commonly called "pacing" and an example of such an implementation is IBM's Virtual Telecommunications Access Method (VTAM). Extra processing by the first system is required in this solution at all times, whether there is a potential problem with the link or not, thus reducing the performance of the link. In addition the use of the link is required to establish if the remote system is operating normally.

In another solution, a first program requests a second program to confirm that it is operating normally. The second program either sends a communication back to the first confirming normal operation or does not respond. This is commonly called "polling". Extra processing by both systems is required with this solution as is use of the communications link itself.

Yet another solution involves the detection of timeouts on any communication link and to use this as an indication that the system at the receiving end of the link is not responding. This solution is also unable to detect the difference between a highly loaded system, which is processing requests at a normal rate, but is simply overloaded, and a system which has stalled and is not processing any requests.

A further prior art solution to the problem is to count the number of requests queued waiting for a link to a particular remote system. When the number of queued requests reaches a threshold value, remedial action is taken. An example of this solution is described in European Patent Application EP A 0 539 130 A2 where the action taken is to reject the request, reroute the request or accept the request. This solution has the advantage that it can detect the status of a remote system without any additional usage of the communications link to that remote system. However, it is unable to detect the difference between a highly loaded system, which is processing requests at a normal rate, but is simply overloaded, and a system which has stalled and is not processing any requests.

U.S. Pat. No. 5,031,089 discloses a distributed computer system in which each node within the system has a queue. All jobs to be performed are placed on one of the queues. A workload value is periodically calculated by each node as a function of the number of jobs on its queue. Workload values are exchanged between the nodes. The jobs on any of the queues may be re-allocated from one node to another node based on the workload values.

Thus the prior art is unable to discriminate between an overloaded system which is still processing items in a queue and a system which is failing.

DISCLOSURE OF THE INVENTION

Accordingly the invention provides a method, for use in a data processing system, of managing a queue of items for processing, the system having a buffer means, the method comprising the steps of: supplying items to the buffer means for removal by removal means, in the event the items cannot be allocated to the buffer means immediately: forming a transient queue means, on receiving an item to be inserted in the queue means: calculating the expected length of time the item will spend in the queue means before removal, comparing the expected length calculated above with a predetermined maximum time value, and if the expected length is greater than the predetermined time value, taking remedial action.

The invention requires extra processing, that is calculation of the expected length of time the item will spend in the queue, only when the buffer means is full. When the buffer means is full, there is a potential problem with the means which removes items from the queue. During normal operation the buffer means do not become full and there is no extra processing required.

Because the invention calculates a parameter corresponding to the rate of removal of items from the queue, rather than the length of the queue, it can differentiate between a queue which exists because a removal means such as a remote system is overloaded and is receiving more requests than it can process, and a queue which exists because the removal means is not processing items from the queue.

The present invention may be applied to a complex where there are multiple remote systems as described in this specification or to a complex where there is only one remote system.

Preferably the remedial action taken is to purge the queue means, but in an alternative embodiment, the remedial action is to suspend putting the items in the queue.

Preferably the method further comprises the steps, prior to the calculation step, of comparing the queue length with a predetermined maximum queue length, and if the queue length is less than the predetermined maximum queue length, inserting the item in the queue means without proceeding to said calculation step. The calculation overhead associated with calculating the expected length of time that an item will spend in the queue is then avoided.

Also provided by the invention is a data processing system comprising buffer means, means for supplying items to be processed to the buffer means, means for removing items from the buffer means, means for creating a transient queue only in the event the items cannot be allocated to the buffers means immediately, means for queuing the items for processing in the transient queue, means for calculating, on receipt of an item by the queue means, the expected length of time an item supplied by the supplying means will spend in the queue means before removal by the removing means, means for comparing the expected length calculated by the calculating means with a predetermined maximum time value, and means for taking remedial action if the expected length is greater than the predetermined time value.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
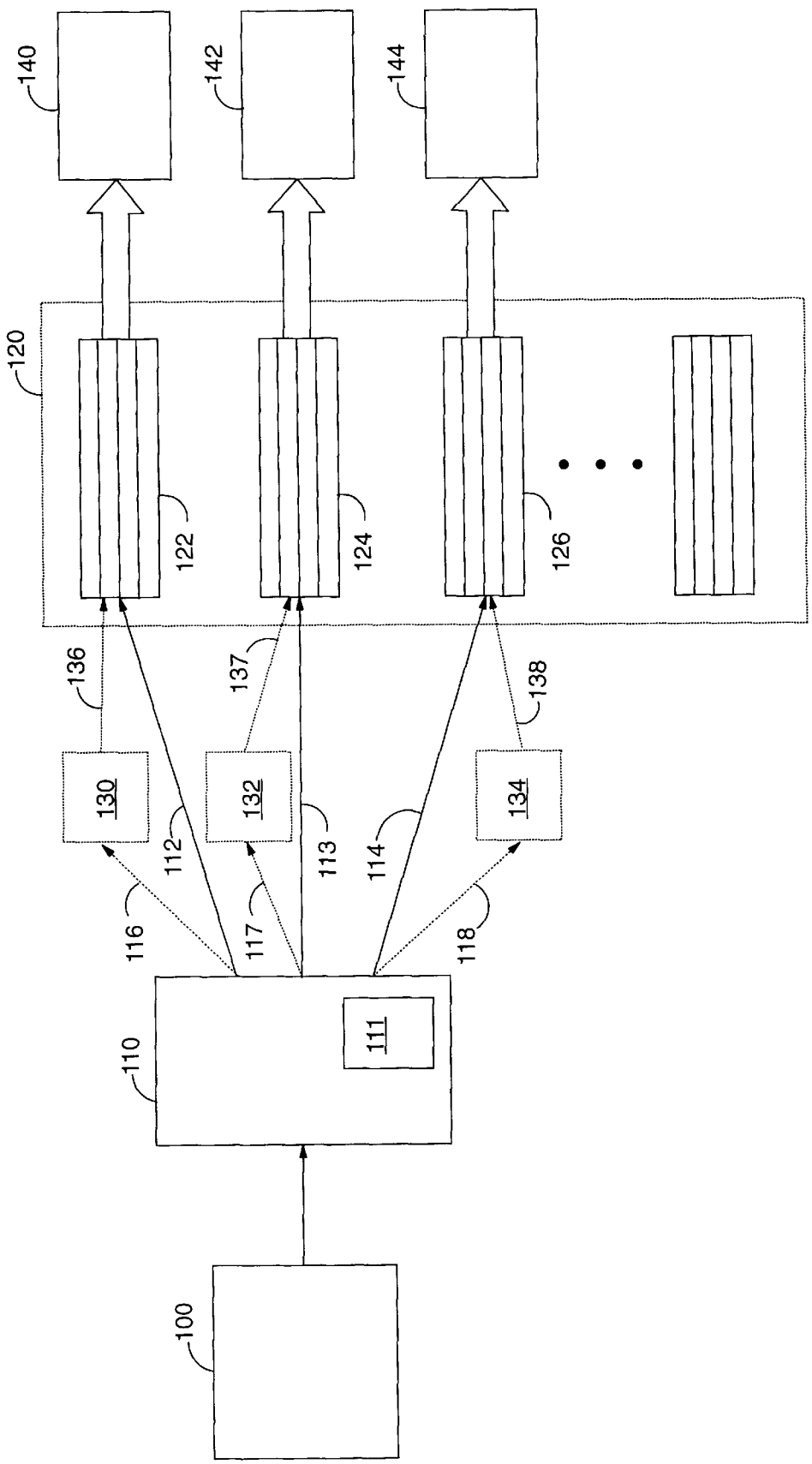
FIG. 1 is a block diagram of a complex of interconnected systems in which the present invention may be used.

FIG. 1 shows a complex of interconnected systems where a local system 100 may request resources located at any of remote systems 140, 142, 144. The system 100 sends its request for the resources to, for example, an allocator 110 which identifies the link between the local system 100 and a remote system 140, 142, 144 which is required to allow those resources to be allocated. The allocator places, or allocates, the request for a link directly 112 into one of a respective set of buffers 122 for transmission to the remote system 140. Second and third sets of buffers 124, 126 are provided for systems 142, 144.

In a complex which is being used for transaction processing, the requests for resources may take a number of forms, including function shipping, transaction routing and distributed program link.

In function shipping, an application program running in a local system 100 accesses resources that are owned by a remote system 140 as though they were locally owned. For the duration of time that the local system is accessing them, the resources are "allocated" to the local system. The resources that may be accessed include files owned by a remote system 140 and transient data or temporary storage queues located on the remote system 140.

As an example, an application program wishes to access data contained in a file called NAMES. The application program issues a command to read part or all of the contents of the file NAMES. The local system 100 looks in a resource definition file to see where the file NAMES resides. In this example, it finds that the file NAMES resides on a remote system 140. The local system 100 takes the information in the read command and generates a request based on the information from the read command and from the resource definition file to be sent to the remote system 140. The request is sent to the allocator 110 to be sent over a link to the remote system 140 where the file NAMES resides.

In transaction routing, a terminal connected to a local system 100 can run an application program in a remote system 140. The terminal requests an application program PROGA to be started. The local system 100 looks in a resource definition file to see where the program PROGA resides. In this example, it finds that the program PROGA resides on a remote system 140. The local system takes the information in the request to start the application program PROGA and from the resource definition file and generates a request to be sent to the remote system 140. The request is sent to the allocator 110 to be sent over a link to the remote system 140 where the program PROGA resides.

In distributed program link, a first application program PROGA running on a local system 100 wishes to pass control to a second program PROGB to execute. The second program PROGB executes and, when it completes, control returns to the first program PROGA. In this example, the second program PROGB resides on a remote system. The first program PROGA issues a command that includes the name of the program PROGB to be run. The local system 100 looks in a resource definition file to see where the program PROGB resides. In this example, it finds that the program PROGB resides on a remote system 140. The local system 100 takes the information from the command to start the application program PROGB and from the resource definition file and generates a request to be sent to the remote system 140. The request is sent to the allocator 110 to be sent over a link to the remote system 140 where the second program PROGB resides. The remote system 140 starts the second program PROGB, which executes, completes and returns control to the remote system 140. This system then informs the local system that it has completed the request.

The local system 100 may be running an application program which is making a request for access to the resources of another system 140 such as input devices, output devices or storage containing programs or data. This access to resources will require a link to the remote system 140 to be made available to the local system 100. An example of a computer program which implements the function of the allocator 110 can be found within the IBM CICS/ESA computer program. The request to the allocator may specify a particular remote system 140 that the request is to be sent to (specific allocate request), or it may allow the allocator to send the request to one of a number of remote systems 140, 142, 144 (non-specific allocate request). If a specific allocate request is made, the allocator places the request into one of a set of buffers 122 from which only the specific remote system 140 that was specified on the allocate request may remove that request and provide a link. If a non-specific allocate request is made, the allocator places the request into one of a set of buffers 120 from which any one of a group of remote systems 140, 142, 144 specified on the allocate request may remove that request and provide a link to the request removing system. Separate sets of buffers 120 are maintained for specific allocate requests for each remote system 140, 142, 144 and for non-specific allocate requests for the whole group of systems 140, 142, 144.

The set of buffers 122 is used to store requests which are destined for a remote system 140. When the remote system 140 responds to requests sent to it, it removes the requests from the sets of buffers 122.

If the remote system 140 is not overloaded and is operating normally, the set of buffers 122 will not become full and the allocator 110 will be able to place the requests directly 112 into one of the set of buffers 122.

If the remote system 140 is overloaded or if the remote system 140 is not operating normally, the set of buffers 122 associated with the remote system 140 becomes full. Each time that the allocator tries to place a link request indicated by line 112 directly into one of the set of buffers 122 and is unable to find a buffer 122 that is free, the request is passed to a queue management portion 111 of the allocator 110. The queue management portion 111 of the allocator 110 initiates a queue 130, 132, 134 of requests waiting to be placed in an associated respective set of buffers 122–124. The queue management portion 111 of the allocator 110 places the request into a queue 130 as indicated by connection 116.

While there are spaces in the set of buffers 120 for the link which is requested, a queue 130 does not exist for those buffers 120 and the queue management of the present invention is not done. When there are no spaces available in the set of buffers 120 for the link which is requested, a queue 130 is initiated and the queue management of the present invention is invoked. This avoids the additional overhead of the queue management while the number of requests waiting to be processing is within preset limits, that is less than the number of buffers 120 allocated by the system for that link.

As a request is removed from the associated set of buffers 122, one of the buffers becomes available and a request can be moved via connection 136 from the queue 130 associated with the set of buffers 122 to one of the buffers by the queue management portion of the allocator 110.

Associated with each queue 130 are two parameters QUEUELIMIT and MAXQTIME stored in a control block, specified by the user of the local system 100, to allow control of the size of the respective queue 130.

QUEUELIMIT is the maximum number of requests that the queue management portion 111 of the allocator 110 should queue while waiting for free space in a set of buffers 122. This can be a number, in the range 0 to 9999 or it can be NO, in which case there is no limit set to the number of requests, that is, an effective value of QUEUELIMIT of infinity. If the number of queued requests reaches this limit, subsequent requests are rejected until the queue 130 drops below the limit. The usage of a parameter such as QUEUELIMIT on its own to control a queue length is known from prior art EP A 0 539 130 A2. QUEUELIMIT is specified by the user of the local system 100 when that user provides the local system 100 with details of the connection to a remote system 140.

A queue 130 may develop during normal operation, but it should be of short length and duration. The QUEUELIMIT parameter ensures that during abnormal conditions the queue 130 does not reach an excessive length.

MAXQTIME is the maximum amount of time that requests are expected to spend on the queue 130. MAXQTIME is used in conjunction with the QUEUELIMIT parameter to further determine the status of a remote system 140 when a queue 130 reaches its maximum length QUEUELIMIT. When the length of the queue 130 reaches its maximum value QUEUELIMIT, the time that a request placed on the queue 130 can be expected to spend on the queue 130 is checked. The way in which this is checked is described below with reference to step 209 in FIG. 2. If the expected time is found to be below MAXQTIME, this indicates that requests are being processed at an acceptable rate, but that the remote system 140 is heavily loaded. If the expected time is found to be above MAXQTIME, this indicates that requests are not being processed at an acceptable rate and there is a potential problem with the remote system 140 or the communication link.

Figure 2:
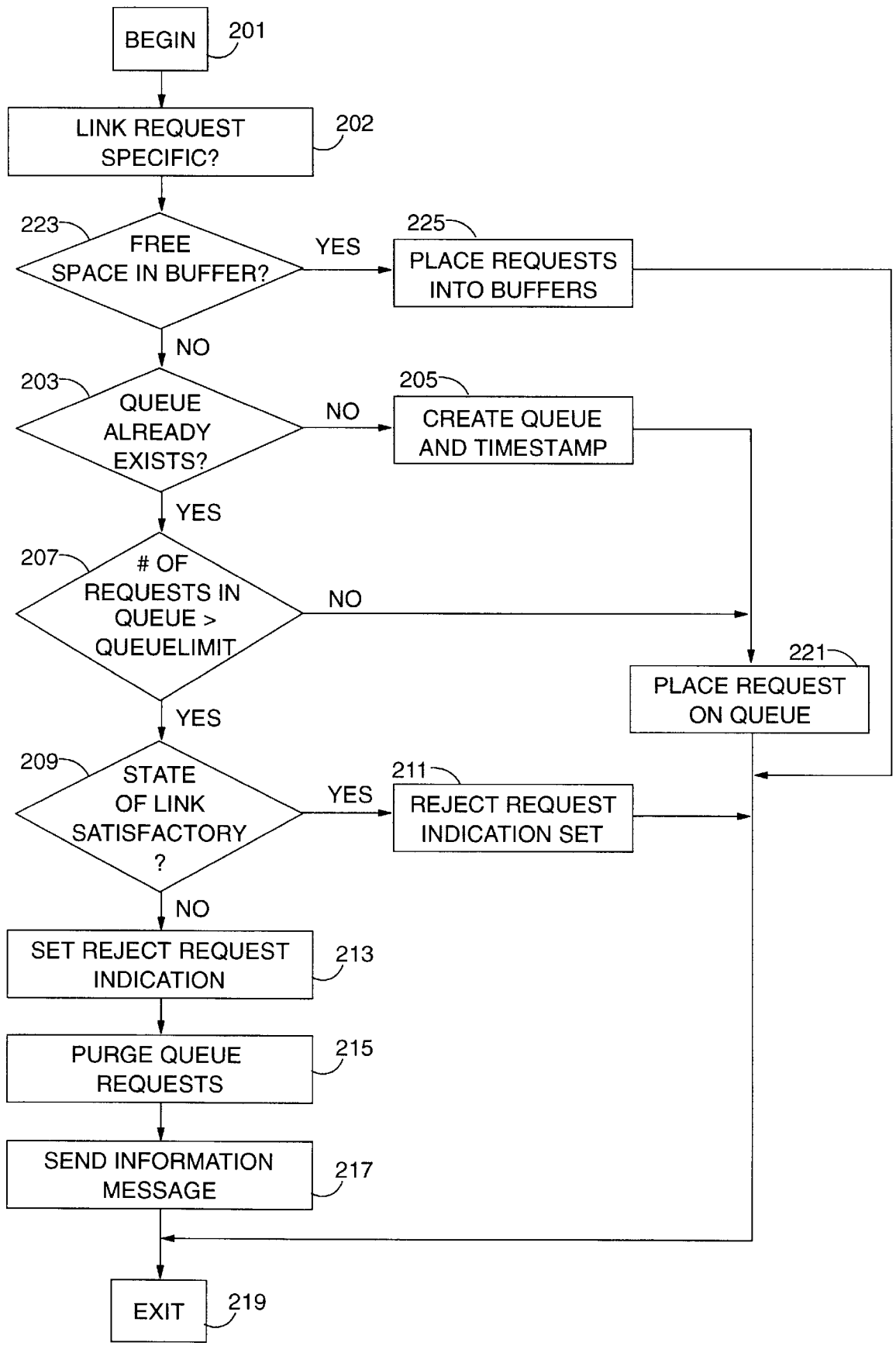
FIG. 2 is a flow diagram of an embodiment of the present invention.

FIG. 2 shows a flow diagram of an embodiment of the present invention illustrating the operation of the allocator 110 of FIG. 1. When the allocator 110 receives a link request to be sent to a remote system 140, the allocator identifies the link which will be required. The flow diagram is then entered at step 201. The allocator 110 determines at step 202 whether the link request is a specific or a non-specific one. The allocator 110 tries to place the request directly into the selected one of the set of buffers associated specifically or non-specifically with that remote system 140 identified in the link request by testing the buffer for free spaces at step 223. If there is space available in the buffer, the allocator 110 places at step 225 the request into the set of buffers and exits at step 219. The link is then established and data can flow between the connected systems. Each buffer in the set of buffers 120 has a flag associated with it which shows whether that buffer is full or available. This is used by the allocator 110 to determine if there is a buffer available. If there is no buffer available in the set of buffers 120 for that request the allocator 110 continues to step 203.

In this embodiment of the invention the remaining steps, which are executed only when there is no space in the set of buffers 122, are performed by the queue management portion 111 of the allocator 110. At step 203, a check is made as to whether a queue 130 already exists for the set of buffers 122 in which it is desired to place the request. The check is made by seeing if a parameter ACNT (described below) is 0. A queue 130 will exist if there has been a previous request for that remote system 140 and the set of buffers 122 for that system 140 is still full. In this case the parameter ACNT will be non-zero. If no queue 130 exists, then a queue 130 is created by the queue management portion 111 of the allocator 110 at step 205, the request is placed in the queue 130 at step 221 and control is returned to the allocator 110 at step 219. The allocator then returns to waiting for further link requests to be received. Additionally at step 205 a timestamp (AQTS) is created by reading the current system time and copying that value into the control block for the queue 130 and a count (ACNT) is initialised for later use to count the number of requests processed since the queue 130 was started. If a queue 130 already exists for the desired set of buffers 122 than execution proceeds to step 207. At step 207 the number of requests presently in that queue 130 is obtained from a control block which is maintained for each queue and this number of requests is checked to see if it exceeds a predetermined limit QUEUELIMIT. If the number of requests does not exceed QUEUELIMIT the request is placed in the queue 130 at step 221, the control block is updated and control is returned to the allocator 110 at step 219.

If the number of requests exceeds QUEUELIMIT, then a check is made at step 209 to see if the state of the link is satisfactory, that is, that requests are being accepted into the set of buffers 122 from the queue 130 within a predetermined maximum time MAXQTIME. The time at which the queue 130 was started AQTS, the current time TIMENOW, the current queue length QUEUE_LEN and the total number of requests ACNT processed since the queue 130 was started is used to determine the expected time to be spent on the queue 130 by requests. The expected length of time a request will spend on the queue 130 is given by the formula:

$$\frac{TIMENOW - AQTS * QUEUE\_LEN}{ACNT}$$

If the expected time spent on the queue 130 does not exceed the predetermined maximum time MAXQTIME, then an indication that the request should be rejected (a return code of PUR) is set at step 211 and control is returned to the allocator 110 at step 219. The allocator then returns to waiting for further link requests to be received. The requesting system can then take further actions such as to repeat the link request or determine an alternative link that it can request. If the average time spent on the queue 130 exceeds the predetermined maximum time MAXQTIME, then an indication that the request should be rejected is set at step 213, all other queued requests for that remote system 140 are purged from the queue 130 at step 215 and an indication that the queue 130 has been purged is made. In the present embodiment the indication that the request be rejected and that the queue 130 has been purged are combined as a return code of KLL. The requesting system, in this case, has the option of rerouting or abandoning its attempt to link to the remote system. An information message is sent to the operator console of the local system 100 at step 217 to indicate the unsatisfactory status of the communications link and also that the queued requests have been purged. Control is returned to the allocator 110 at step 219. The allocator then returns to waiting for further link requests to be received.

After a queue 130 has been purged, a count (ARC8) is kept of the number of buffers within the set of buffers 122 which have been freed as a result of the remote system 140 processing requests. This count is used to determine when the queue management portion 111 of the allocator 110 will restart putting requests onto the queue 130 which was purged. When the count (ARC8) reaches a predetermined value the queue management portion 111 of the allocator 110 will restart putting requests onto the queue 130. The predetermined value is set by the user of the local system 100 and may be, for example, 1 or one half of the number of buffers in that set of buffers 122. This may be implemented by, for example, the following pseudo-code which is called at intervals of time by the queue management portion of the allocator 110.

Read count (ARC8) of number of buffers freed since queue was purged.
Compare count (ARC8) with predetermined value.
If count is greater than predetermined value,
    Then resume normal insertion of requests into the queue,
    Else do nothing.
Exit.

The following table lists the parameters relevant to this invention which are used by the queue management portion of the allocator. These parameters are supplied to the queue management portion whenever it is called by the allocator. Each request for a link has its own set of these parameters.

Table 1—Parameter list
SYSID The 4-byte ID of the link to the remote system 140

The queue management portion 111 of the allocator 110 creates and stores the following additional parameters for use in managing the queue 130. Each request for a link has its own set of these parameters.

AQTS Time stamp indicating the time the queue 130 of requests was started (this is created by step 205 in FIG. 2)
ACNT The number of requests processed since the queue 130 was started (this is created by step 205 in FIG. 2 and updated by step 305 in FIG. 3)
ARC8 The number of buffers within the set of buffers 122 which have been freed since the queue 130 was last purged as a result of a KLL return code The following table lists the return codes which are returned by the queue management portion 111 of the allocator 110 to the allocator 110.
Table 2—Return codes QUE Queue the request.
PUR Reject the request. Allocator 110 returns an error to the application program which submitted the request.
KLL Reject the request. Purge all other queued requests and send an information message to the operator console of the local system 100. Allocator 110 also returns an error to all application programs running on the local system 100 waiting on the purged requests.

Figure 3:
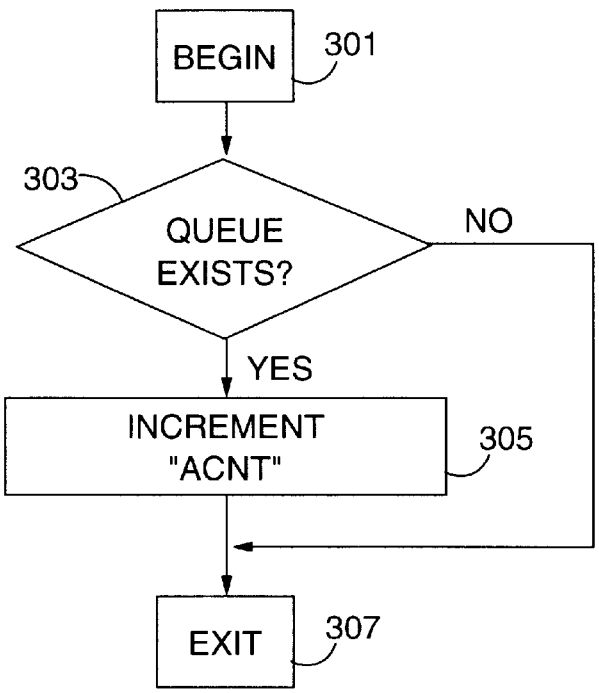
FIG. 3 is a flow diagram showing how a count of requests processed is maintained for use in the embodiment of FIG. 2.

FIG. 3 shows how the ACNT parameter in table 1 is maintained. Each time a request is moved into the set of buffers 122, a check is made at step 303 to see if a queue 130 exists. If a queue 130 does not exist, the ACNT parameter will not be relevant and no changes are made. If a queue 130 exists, the ACNT parameter (number of requests processed since the queue 130 was started) is incremented at step 305.

Purging of the queue 130 of allocated requests, which are causing congestion in the overall flow of requests from the local system 100 to remote systems 140, 142, 144, frees resources, such as memory being used for control blocks, which are needed to prevent the complex becoming clogged.

We claim:
1. A method for use in a data processing system for managing a queue of items for processing, the system having buffer means for storing said items, means for supplying said items to the buffer means and removal means for removal of said items, wherein in the event said items cannot immediately be allocated to said buffer means, said method further comprises:

forming a transient queue means for receiving unallocated items;
calculating the expected length of time an unallocated item will spend in the transient queue means before removal;
comparing the expected length calculated above with a maximum time value; and
if the expected length is greater than said maximum time value, reject the entry of additional unallocated items in said transient queue means; and,
wherein the expected length of time the item will spend in the transient queue means before removal is calculated in accordance with the following:

$$\frac{TIMENOW - AQTS * QUEUE\_LEN}{ACNT}$$

where
TIMENOW=current time, AQTS=time transient queue means was formed,
QUEUE_LEN=number of items currently in the transient queue means, and
ACNT=total number of items inserted in the transient queue means since said transient queue means was formed.

2. A method as claimed in claim 1 wherein if the expected value of calculated length of time is greater than the maximum time value, the transient queue means is purged.

3. A method as claimed in claim 1 wherein if the expected value of calculated length of time is greater than the maximum time value, the transient queue means is purged.

4. A method as claimed in claim 1 further comprising the steps, prior to the calculation step of:
   comparing the transient queue length with a predetermined maximum queue length; and
   if the queue length is less than the predetermined maximum queue length, inserting the item in the transient queue means without proceeding to said calculation step.

5. A method as claimed in claim 3 further comprising the steps, prior to the calculation step of:
   comparing the transient queue length with a predetermined maximum queue length; and
   if the queue length is less than the predetermined maximum queue length, inserting the item in the transient queue means without proceeding to said calculation step.

6. A data processing system comprising:
   buffer means;
   means for supplying items to be processed in said data processing system to said buffer means;
   means for removing items from said buffer means;
   means for creating a transient queue only in the event items cannot be allocated to the buffer means immediately;
   means for queuing said items for processing in said transient queue;
   means for calculating, on receipt of an item by said transient queue means, the expected length of time an item supplied by the supplying means will spend in the transient queue means before removal by the removing means;
   means for comparing the expected length calculated by the calculating means with a predetermined maximum time value;
   means for taking remedial action if the expected length is greater than the predetermined time value;
   wherein the means for calculating the expected length uses the formula, $$\frac{TIMENOW - AQTS * QUEUE\_LEN}{ACNT}$$

where
TIMENOW=current time,
AQTS=time queue means was formed,
QUEUE_LEN=number of items currently in the queue means, and
ACNT=total number of items inserted in queue means since queue means was formed.

7. A data processing system as claimed in claim 6 wherein the means for taking remedial action purges all items from the queue means without processing the items and provides an indication that the queue means has been purged.

8. A data processing system as claimed in claim 6 further comprising:
   means for comparing the number of items in the queue means with a predetermined maximum number; and
   means for inserting the item into the queue means if the number of items in the queue means is less than the predetermined maximum number, said calculating means being operative only if the number of items in the queue means is greater than predetermined maximum number.

9. A data processing system as claimed in claim 6 wherein said means for supplying items is a local system and wherein the means for removing items is a remote system with said items being requests for a communications link between said local and remote systems.

10. A data processing system as claimed in claim 9 wherein a permanent buffer is provided for each remote system to hold said communications link requests, said means for queuing items being operative to form a transient queue only if the buffer for the remote system identified in the link request is full.

* * * * *